(12) United States Patent
Amburn

(10) Patent No.: US 7,356,499 B1
(45) Date of Patent: Apr. 8, 2008

(54) METHOD AND APPARATUS FOR AUTOMATED TRADING OF EQUITY SECURITIES USING A REAL TIME DATA ANALYSIS

(75) Inventor: Dean Amburn, 4833 Waldon Woods Dr., Commerce Township, MI (US) 48382

(73) Assignee: Dean Amburn, Bloomfield Hills, MI (US)

( * ) Notice: Subject to any disclaimer, the term of this patent is extended or adjusted under 35 U.S.C. 154(b) by 0 days.

(21) Appl. No.: 09/500,624

(22) Filed: Feb. 9, 2000

(51) Int. Cl.
*G06Q 40/00* (2006.01)
(52) U.S. Cl. .................. 705/37; 705/36 R; 705/35; 705/38
(58) Field of Classification Search ............. 705/37, 705/35, 36, 36 R; 235/379, 380; 706/47
See application file for complete search history.

(56) References Cited

U.S. PATENT DOCUMENTS

| | | | |
|---|---|---|---|
| 2,046,381 A | | 7/1936 | Hicks et al. |
| 3,296,597 A | | 1/1967 | Scantlin et al. |
| 3,573,747 A | | 4/1971 | Adams |
| 3,716,835 A | | 2/1973 | Weinberg et al. |
| 4,674,044 A | | 6/1987 | Kalmus et al. |
| 5,101,353 A | | 3/1992 | Lupien et al. |
| 5,297,032 A | | 3/1994 | Trojan et al. |
| 5,313,560 A | * | 5/1994 | Maruoka et al. ............. 706/50 |
| 5,557,517 A | * | 9/1996 | Daughterty, III ............ 705/37 |
| 5,732,397 A | | 3/1998 | DeTore et al. |
| 5,845,260 A | * | 12/1998 | Nakano et al. ............... 705/26 |
| 5,845,266 A | * | 12/1998 | Lupien et al. ............... 705/37 |
| 5,864,827 A | | 1/1999 | Wilson |
| 5,884,286 A | | 3/1999 | Daughtery, III |
| 5,950,176 A | | 9/1999 | Keiser et al. |
| 5,963,923 A | * | 10/1999 | Garber ......................... 705/37 |
| 6,014,627 A | | 1/2000 | Togher et al. |
| 6,131,087 A | | 10/2000 | Luke et al. |
| 6,134,535 A | | 10/2000 | Belzberg |
| 6,247,000 B1 | * | 6/2001 | Hawkins et al. ............. 705/37 |
| 6,278,982 B1 | * | 8/2001 | Korhammer et al. ........ 705/37 |
| 6,317,728 B1 | * | 11/2001 | Kane ........................... 705/37 |
| 6,408,282 B1 | * | 6/2002 | Buist ........................... 705/37 |
| 6,493,681 B1 | * | 12/2002 | Tertitski et al. ............. 705/36 |
| 2001/0042033 A1 | * | 11/2001 | Sposito ....................... 705/35 |

FOREIGN PATENT DOCUMENTS

EP    0 952 536 A1    10/1999

OTHER PUBLICATIONS

Tradetrek.com, Mar. 3, 2000 "Fundamental Analysis" Web page analyzes and generates P/E ratio—1 page.*

(Continued)

*Primary Examiner*—Harish T. Dass
(74) *Attorney, Agent, or Firm*—Howard & Howard

(57) ABSTRACT

A system and method for buying and selling securities based on volatility and liquidity rather than other fundamentals is demonstrated. The method involves: providing at least one decision model to buy and sell a security; inputting real-time data into the decision model; and automatically generating an order and executing transactions to buy and sell the security based in response to the decision model. The method continues in buying and selling the security based in response to decision model until the method is stopped.

7 Claims, 10 Drawing Sheets

OTHER PUBLICATIONS

Tradetrek.com, Feb. 19, 2000 "Day Trading Strategies" show stop-loss trading—3 pages.*
Trade Now Daily Bulletine, 1999 shows the stop-limit trading.*
Function (mathematics): http:en.wikipedia.orgwiki/Mathematical_function.*
Expression (mathematics): http:en.wikipedia.orgwiki/Mathematical_expression.*
CyBerCorp "Trader's Workstation an Integrated Trading Environment version 1.7" dated Oct. 1998 (35 pages).*
CyBerCorp "Trader's Workstation an Integrated Trading Environment version 1.7" dated Oct. 1998 (pp. 36-134).*
Electronic Trading Guide for NASDAQ Level 2 by Online Trading Academy.com dated Jul. 1999.
CyBerTrader Version 2.1 Manual by CyBerCorp, Inc. dated Feb. 2000.
Townsend Analytics, Ltd. User Guide, Edition 2.1 dated Jul. 1999.
Townsend Analytics, Ltd. User Guide, Edition 2.0 dated Aug. 1999.
Technical Analysis of Stock Trends by Robert D. Edwards and John Magee, $7^{th}$ Ed., dated 1998.
Trading as a Business by Charlie F. Wright, dated 1998.
Digital Day Trading: Moving from One Winning Stock Position to the Next by Howard Abell, dated 1999.

* cited by examiner

Figure 8

Detail for step 534

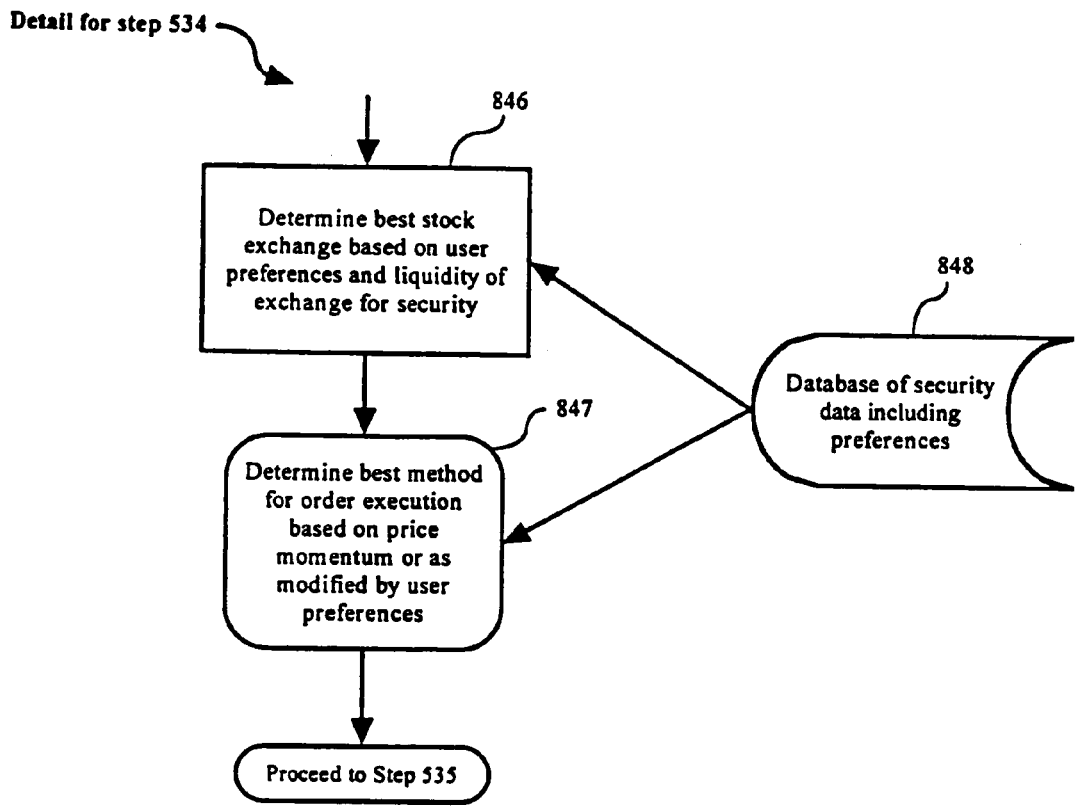

Figure 9

|  | Price Momentum ↑ | Price Momentum ↓ | Price Momentum ↔ |
|---|---|---|---|
| Buy Order | Bid High | Bid Low | Bid Low |
|  | Bid Preference High | Bid between spread | Bid between spread |
|  | SOES Buy |  | SOES Buy |
| Sell Order | Offer High | Offer Low | Offer High |
|  | Offer between spread | Offer Preference Low | Offer between spread |
|  |  | SOES Sell | SOES Sell |
| Sell-Short Order | Offer High | SOES on ↑ tick | SOES on ↑ tick |
|  | Offer between spread | Offer Low on ↑ tick | Offer Low on ↑ tick |
|  |  | Offer 1/16 above on ↓ tick | Offer 1/16 above on ↓ tick |

METHOD AND APPARATUS FOR AUTOMATED TRADING OF EQUITY SECURITIES USING A REAL TIME DATA ANALYSIS

TECHNICAL FIELD

The present invention relates generally to automated systems for trading securities, and more specifically to an apparatus and method for automatically buying and selling equity securities based on market trends in response to pre-established decision models for the particular security.

BACKGROUND

A group of investors called day traders typically trade securities throughout the trading day. Day trading may be a hobby or rise to the level of a career. Unlike long term investors, day traders seek to capitalize on incremental trends in the price of securities throughout the trading day.

Day trading involves careful monitoring of a security and deciding whether to buy or sell based on intraday movements of the price and the trend of the security. Successful day trading depends on the ability to recognize a trend and the market momentum therein, timely execution of a buy or sell order, and a determination of when to forego a transaction.

There are different methods of day trading. One popular method is to track and trade highly volatile securities by attempting to buy when the security price is moving up or sell short when the security price is moving down. Various other sources of information besides price, such as volume, are often considered in deciding to enter into a transaction. Technical analysis of stock prices tell us that prices tend to move in trends, volume of traded securities corresponds with the trends, and a trend once established has momentum and tends to continue in force.

Some of the data that day traders monitor in order to determine a trend include: price; bids; asks; spread between the inside bid/ask; and the number of shares on the bid or ask side. Other general market data may also be considered such as futures contracts, economic indicators and financial news sources such as CNBC.

Day traders tend to focus on a very small number of stocks relative to the entire stock market. Day traders commonly monitor real-time data presented on the trader's computer screen. One difficulty in day trading is analyzing the large volumes of available data. Timely deciding whether to enter into a transaction is critical. Delays of a few seconds can make the difference in catching a trend near the start, middle or end.

Another problem with day trading is the ability to enter appropriate buy/sell orders quickly and to have them executed. That is, once a decision is made, the order should be placed before the market fluctuates much. Many day traders monitor multiple data sources then must format an appropriate buy or sell order. Particularly if multiple events occur, a significant amount of time may lapse.

Another method of day trading is to monitor a specific stock that usually makes little movement in price during the trading day. A day trader may attempt to exploit a spread between a prevailing bid and ask to make a small profit. This method requires repeatedly buying and selling the security. The profits are typically on the order of 1/16 or 1/8 of a point. Stopping losses by quickly exiting a transaction that is not profitable is crucial. This method of trading is commonly referred to as scalping.

Various known systems for automatic transactions have been proposed in the prior art. Some systems are intended to create an automated market for securities. Two such systems are disclosed in U.S. Pat. Nos. 5,950,176 and 4,674,044. These systems automate a security market by taking buy and sell orders from several sources and setting a price based on supply and demand.

Other systems are intended to manage large investor portfolios or for use by institutional investors. For example, U.S. Pat. No. 5,101,353 and other patents are commonly used for large institutional investors. Such systems allow institutions to anonymously buy and sell large blocks of securities. The system is somewhat automated in that buy and sell orders at specific prices are communicated to the markets where they are executed. However, the analyzing of the price and the determination of orders is operated by a registered investment advisor. The system is used to match internal buy and sell orders before placing market orders.

Other known systems are used in a similar fashion. That is, buy and sell orders are manually placed. Thus, the systems are only partially automated. Further, many of these systems are particularly suited for institutional trading.

Institutional investors, retail brokerage houses and private corporations may also participate in program trading. Program trading as defined by the New York Stock Exchange® ("NYSE") involves the simultaneous buying and selling of at least 15 different stocks with a market value of $1,000,000 or more. Program trading is designed to take advantage of the inefficiencies in the market between stock prices and futures or options contracts. Program trading is typically just price based. The bulk trading of stocks or options are executed at different times under strict market rules. These types of systems are inherently different and not available to day traders.

It would therefore be desirable to provide a system available to day traders that is capable of quickly entering into buy and sell transactions to take advantage of market momentum.

SUMMARY OF THE INVENTION

It is therefore one object of the invention to automatically buy, sell or sell short equity securities. It is a further object of the invention to quickly identify and react to trends or momentum in price movement for a security. Another object of the invention is to provide a system that both buys securities on the identification of a trend and sells securities automatically when the end of the trend is determined.

The present invention provides a method for buying and selling securities based on volatility and liquidity rather than commonly used stock fundamentals. In one aspect of the invention, a method for trading a security comprises the steps: formulating a decision model for the security; monitoring real-time market data; in response to the market data for the security and the decision model, automatically generating a transaction order; and transmitting the transaction order to a market computer.

One feature of the invention is that it allows the system operator to develop decision models. The decision models are not limited to variations of traditional technical analysis but instead can include novel analysis of data.

Another feature of the invention is that after an order is placed, the transaction may be monitored until execution. Until the transaction has been executed the decision model is monitored to determine whether to cancel the order.

A further feature is related to how a transaction is reversed once initiated. For example if a security is bought it can be sold through a decision model to sell or through a floating stop loss process.

In a further aspect of the invention, an automated securities trading system comprises a computer for formulating a decision model for the security. The computer is coupled to a network and receives real-time market data. The computer automatically generates a transaction order in response to the market data based upon the decision model. The computer places the order.

One advantage of the invention is that if the system is used to monitor multiple securities, different decision models may be used for each. Another advantage of the invention is that both buy and sell orders may be automatically executed by the system so that the orders are processed quickly to take advantage of price trends and momentum in the market as desired by day traders.

A further feature and advantage of the invention is that it may monitor real-time data and make decisions to buy or sell on a moment by moment basis. Several securities may be concurrently monitored through the decision models and transacted on a moment by moment basis.

Other objects and features of the present invention will become apparent when viewed in light of the detailed description of the preferred embodiment when taken in conjunction with the attached drawings and appended claims.

BRIEF DESCRIPTION OF THE DRAWINGS

The present invention will become more fully understood from the detailed description and the accompanying drawings, wherein:

FIG. 8 is an order preparation flow chart according to the present invention.

FIG. 9 is an order execution preference chart according to the present invention.

DESCRIPTION OF THE PREFERRED EMBODIMENTS

Figure 1:
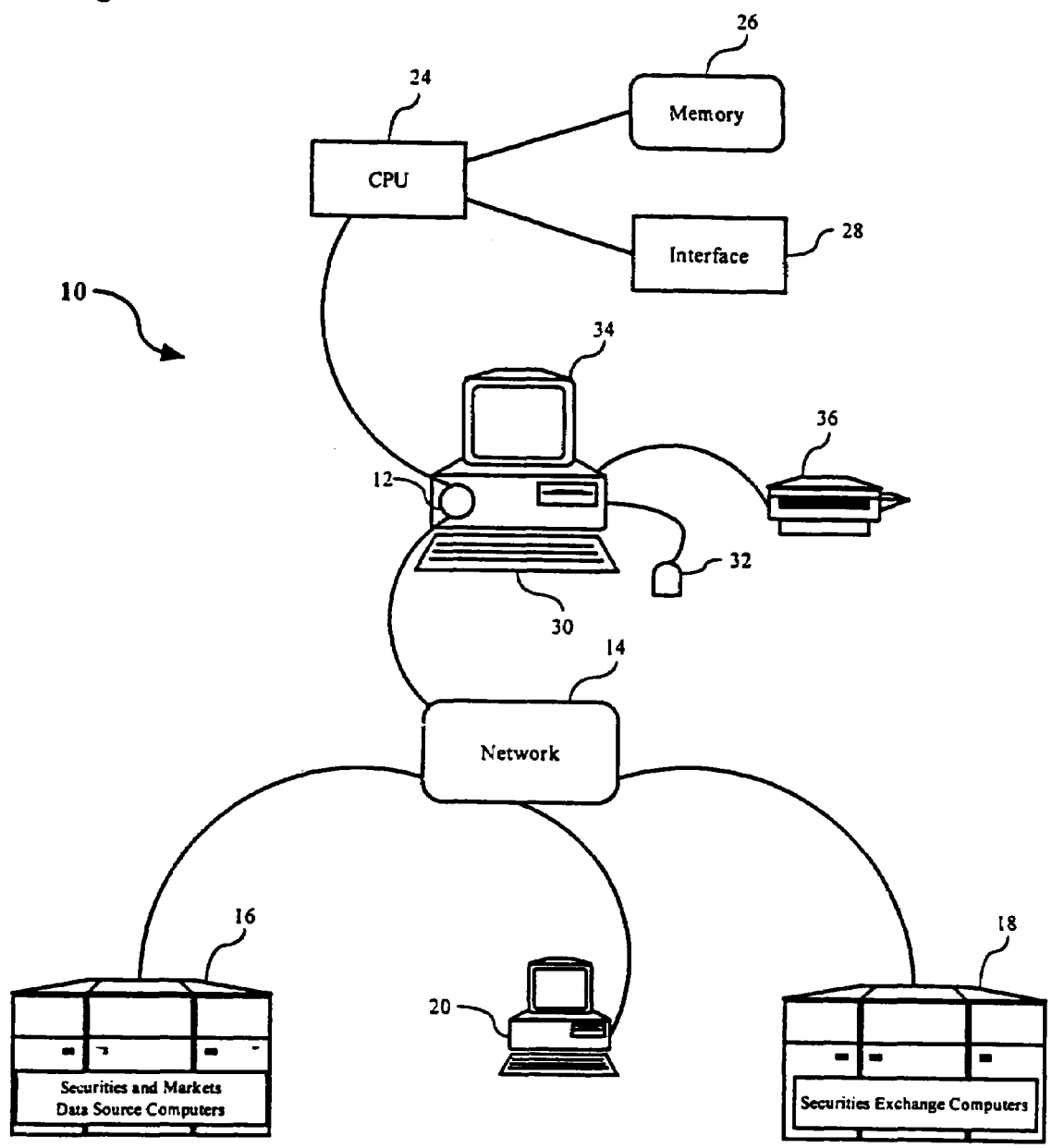
FIG. 1 is a block diagrammatic view of a trading system according to the present invention.

In the following figures like reference numerals are used to identify identical components in the various views. The following example is meant to be illustrative of a preferred method for implementing the automated trading securities system. However, those skilled in the art will recognize various alternative embodiments. For example, various decision models using various security or market data may be implemented.

Referring now to FIG. 1, an automated securities trading system 10 is illustrated. The automated trading system 10 has a personal computer (PC) 12 that is coupled to a network 14. Network 14 is coupled to a data source computer 16 and a market computer 18. The automated trading system 10 may also be remotely accessed through the network 14 by another computer including a PC, hand held computer or a laptop computer 20.

Personal computer 12 is the most likely implementation of the present invention. However, other computing systems such as mainframes or minicomputers may also be used.

Personal computer 12 has a central processing unit (CPU) 24 with memory 26. Memory 26 includes: random access memory (RAM); read only memory (ROM); flash or cache memory; a hard drive; and other data storage devices. Various data and a program for operating the present invention may reside in memory 26. CPU 24 has an interface 28 that is used to couple personal computer 12 to network 14. Various operating systems known to those skilled in the art may be used to operate personal computer 12. CPU 24 operates the software in conjunction with input devices such as a keyboard 30 and a mouse 32. Various data are displayed on a monitor 34. A printer 36 coupled to computer 12 is used to print displayed information and reports, from computer 12.

Network 14 is illustrated as hard wire connections between computer 12, data source 16 and market computer 18. Network 14 may, for example, be the Internet, or other network known to those skilled in the art. Interface 28 represents the connection to the network 14. Interface 28 may include but is not limited to a dial up modem, a cable modem, an ISDN line, a DSL line, a T1 line, or various other data lines and connectors known to those skilled in the art. Interface 28 may also include but is not limited to: wireless connections such as through satellites; high data rate wireless technology (HDR); or wireless phone networks.

Although illustrated as a single wide area network (WAN), the present invention may be implemented using several networks including a local area network (LAN). For example, both a WAN and a LAN may be used. For a LAN, a client/server network may be used having various numbers of client workstations connected thereto. The client/server network may be coupled to a WAN such as the Internet.

Data source 16 is illustrated as a single source. However, data source 16 represents a variety of potential data sources. Computer 12 may be used to select desired information from the variety of data sources. Data source 16 preferably provides real-time security data. Although, this real-time security data may also be provided together with historical data. Data source 16 specifically may provide National Association of Securities Dealers Automated Quotation System ("NASDAQ") level II data or similar data. NASDAQ level II data provides detailed information about the current market for a specific security. Level II data includes details about bids, and asks, as well as the identity of the market maker for the bid/ask and numbers of shares offered. Also, the numbers of shares and the time that they were sold is also provided.

Sources for data such as NASDAQ level II are available through several third-party vendors including: Bridge; S & P Comstock; and, eSignal. Data source 16 may include but is not limited to any of the above sources.

The present invention is intended to work with various types of market computers 18. For example, the present invention preferably is configured to allow communication with the NYSE, NASDAQ, and various electronic communication networks (ECN) such as ISLAND. Market computer 18 may be an Internet brokerage as well. Market computer 18 accepts preformatted security orders and implements the transaction as soon as the market will accept it. A confirmation is provided by market computer 18 upon the actual transaction being completed. A preferred embodiment of the market computer will allow for direct access electronic trading (DAET).

Data source 16 and market computer 18 may coexist at a common location. For example, data source 16 and market computer 18 may exist together at an Internet brokerage. Data source 16 and market computer 18 may also be integral meaning they exist as one computer system, for example the NASDAQ computer system or the NYSE computer system. Alternatively, data source 16 and market computer 18 may exist at different locations and be accessed by different means. For example, interface 28 for the data source 16 may be a satellite connection. At the same time interface 28 for the exchange computer 18 may be an Internet connection through a telephone modem.

Figure 2:
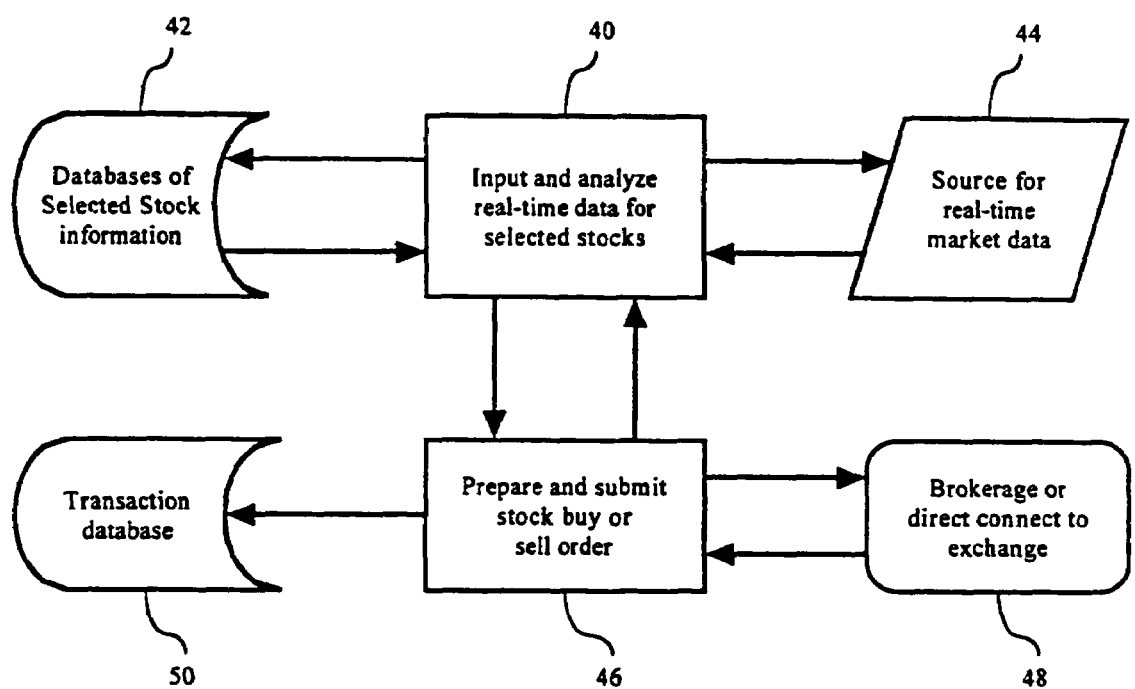
FIG. 2 is a high level system flow chart according to the present invention.

Referring now to FIG. 2, a high-level flow chart of the operation of the present invention is illustrated. In block 40, data for selected stocks are input and analyzed. The identity of securities to transact and associated decision models are taken from database 42 and stored in memory 26 for processing in step 40 by computer 12. Block 44 provides a source for real-time stock data. The data may be obtained from data source 16. Real-time data from block 44 may eventually become part of historical databases 42 for use in decision models.

In block 46 orders are prepared and submitted. The orders may include buy orders, sell orders, sell short and buy to cover orders. These orders are prepared in response to the real-time data for selected stocks from step 40 and based upon the formulated decision models therein. These transactions are prepared and formatted in CPU 24. The orders are transmitted to a brokerage or directly to an exchange 48. In response to executed orders, a transaction database 50 may be used to store historical data for transactions of the system.

Figure 3:
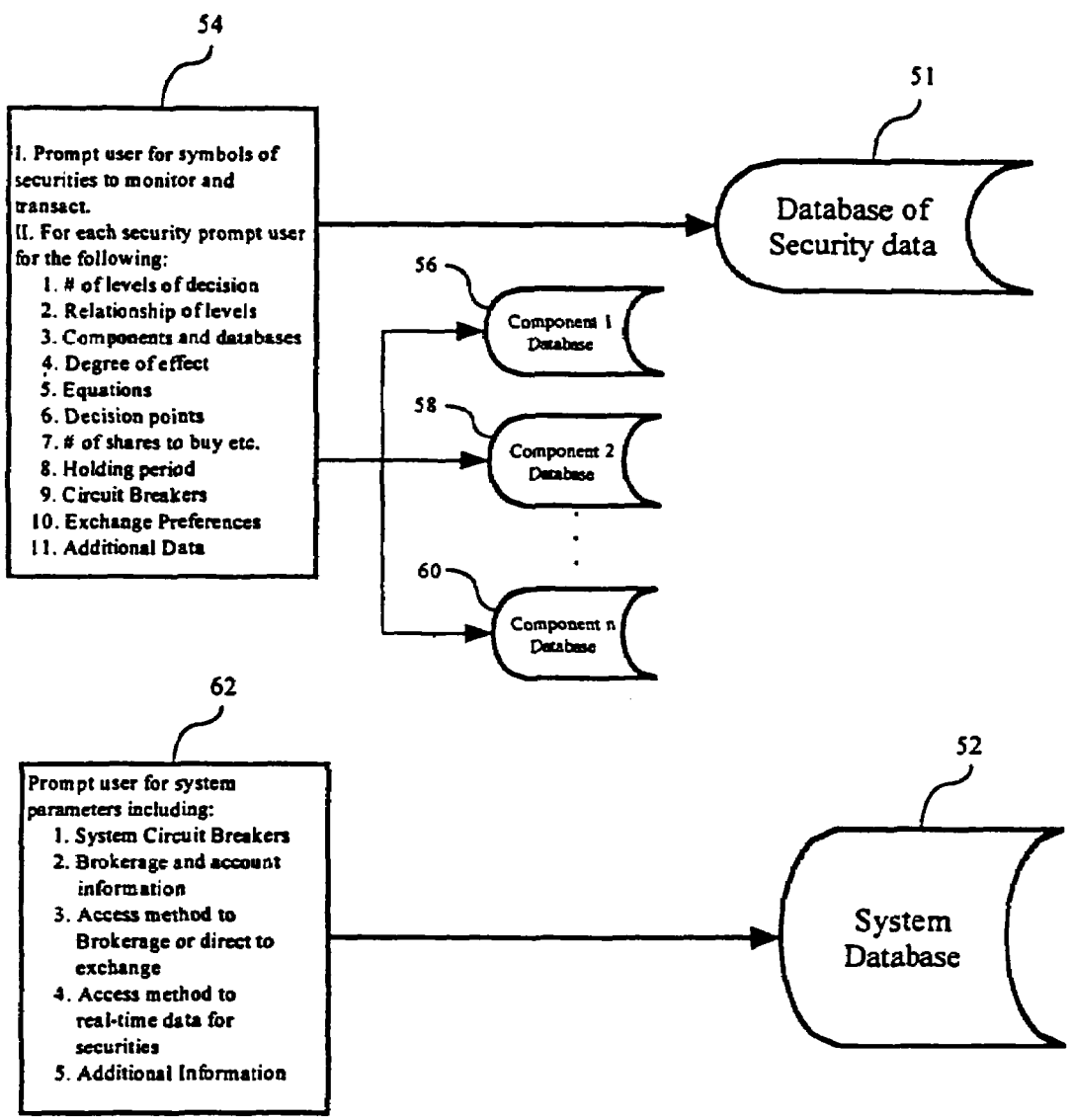
FIG. 3 is a block diagram of data entry for the system according to the present invention.

Referring now to FIG. 3, to initialize the system, a database of security data 51 and a system database 52 is constructed. Computer 12 in block 54 prompts the user for security symbols to monitor as well as various information about each security. The prompted information will generate the decision model for the various securities. Examples of information to be input in block 54 include: the number of levels of decision; the relationship of levels; the components and databases; the relationship between components; various equations; decision points; the number of shares to buy or limits therein; the holding period; various circuit breakers; exchange preferences; and, any additional data deemed significant in the operation of the system. As part of this process various databases 56, 58, and 60 can be established to receive and store security data to be used in components. Once a decision model is established it can be applied to any security. The system will offer the operator the option of selecting or modifying decision models provided with the system. Each area of additional information is discussed in greater detail below.

1. Number of Levels of Decision

A "level" refers to a separate grouping of components in the decision process. There must be at least one level and there may be several but in most applications only a few will be appropriate. The user enters a number of levels of decision from 1 to n.

For example one level may be selected with two components therein. Alternatively, four levels can be used with the first two using a single component and the next two using three and four components respectively. Nearly an unlimited number of combinations are available.

In the decision process a level will return a true or false value. A level returns a true or false value depending on whether the components have reached their decision points or range.

2. Relationship of the Levels

The relationship between levels is a decision process as it relates to the levels. In general, a Boolean operation such as AND, OR, NOT will be used to compare the levels for making a decision. For example a decision model could have two levels with the following relationship: Level 1 <AND> Level 2. An alternative model could employ three levels with the following relationship: (Level 1 <OR> Level 2) <NOT> Level 3. The user will have virtually unlimited discretion in the relationship of levels.

3. Components and Databases

A "component" can be an element of data or an assigned function of data for a security, or market in general. With few exceptions the security data of interest is dynamic and available in real-time. Security data includes but is not limited to its: price; volume; bids; asks; spread; number of shares at each price level of bid; number of shares at each price level of ask; time and sales; actions of market makers or specialists. Market data includes but is not limited to the following: NASDAQ volume or level; S&P futures volume or level; and Dow volume or level. There can be more than one function of a certain data type.

For example, a component may be a function of volume traded for a security. Another component could be a function of how close the current price is to the inside bid or ask. A third component may be a function of the S&P futures. A fourth component may be based on tracking the activities of market makers. One of several ways this may be done is to assign a value to each of the finite number of market makers. A component may then be developed to track the activities of market makers including their offers or bids. The group of components available is only limited by the data accessible for a specific security or market.

A component can also be a function of historical data retrieved from a database for a security. Component databases 56, 58, 60 illustrate the databases that can be established for creating a source for component data. To create a component database, the user defines the data or function of data that is placed in the database. Any of the available security data that can be incorporated into a component may be placed in a component database. For example, a component could relate to the volume of shares traded and number of trades made at a specific price level. This type of component database may be used to identify support and resistance levels. A component may then be established to anticipate buying or selling pressure based on the database for how actively the security was traded in the past as the security approached a certain price level.

As illustrated, several component databases 58, 59 and 60 can be established for each level in the decision model. A virtually unlimited number of component databases can be established for each separate decision model.

In a preferred embodiment, a selection from an offering of the most commonly used components and component databases may be offered. Other components or functions of data may be customized.

4. Relationship of Components

There are several ways of defining a relationship between the components on each level. These include but are not limited to the following: 1. weighted data summation; 2. interaction or intersection; and, 3. singular values.

Each level can combine more than one component. In the intersection or interaction relationship the components may have a relationship that allows them to be combined to produce a net result. For example, one component may be a moving average of price for the preceding thirty ticks of data. Another component may be a moving average of price for the preceding ten ticks. A relationship may then be established where if one moving average crosses the other, then the condition (buy, sell, etc.) for the level has been met.

In the weighted data format the components are assigned equations that gives weight to the data. For example, one level could have three components. The first component may be a measure of volume. The second component may be a measure of price change. The third component may be a measure of how close the price is to the inside bid or ask. A relationship may then be established where the volume component is 20% of the total, the measure of price change may be 30% of the total, and the spread 50% of the total. This means no matter how high the volume goes it can only contribute 20% to the total deciding factor.

A significant value of this method is that it allows a combining of data that does not easily lend itself to comparison. It also allows for creating a sliding scale for each component that when combined produces a sliding scale of the total where no one component exclusively controls the net result.

5. Equations or Formulas

Each component may be assigned an equation that works as a function of security data. The assigned equation serves more than one purpose. First, the equation may be a function of the data that gives it meaning. Second, the equation in the weighted data relationship may establish a continuum between low and high values. Third, in the weighted data format it may be used to give a weight to the data that can then be combined with other weighted data to give a combined result.

The user may be given options of equations for a component as part of the component selection process. Alternatively, a customized equation may be entered.

6. Decision Points

A decision point refers to the moment data entered into a component reaches a predetermined level that satisfies the users criteria, in that component, for making the decision to buy, sell, sell short or buy to cover. A decision point may be a number, range of numbers or interaction between functions. For example a decision point may be when the price of a security increases by ⅛ point. It may also be when the average volume falls within a certain range. In addition a decision point could be when two different trailing averages intersect. The user has wide discretion in the definition of decision points.

As illustrated in block 62 information will be requested for input to system database 52. Block 62 may prompt the user for various pieces of data with respect to the overall system. For example, block 62 may prompt the user for system circuit breaker, brokerage and account information, the access method to the brokerage or to the exchange, the access method to the real-time data for securities, and any other system information.

Other information about the total number of shares that the system should buy or sell short may be used. It also tells the system how many shares should be bought or sold in a single transaction.

In block 54 information about holding periods, circuit breakers, exchange preferences and additional data will also be requested. Holding period refers to issues such as whether to hold a security overnight or have a mandatory sell at the end of the day.

Circuit breakers refer generally to trigger points that require a halt in part or all trading. An example may be when the system executes too many trades in a given time period. Another example of a circuit breaker is when the system achieves a level of draw down (loss of capital) that is not acceptable. Several circuit breakers may be offered.

Exchange preferences refer to user defined preferences for the particular exchange to use and the type of order to execute. For example all trading could be limited to one ECN such as ISLAND or spread around to several. In addition the order to buy could be always at the market or at the inside bid. Several options will be available.

As illustrated in block 62 there are several areas of information requested including: system circuit breakers; brokerage and account information; access method to brokerage; access method to real-time data; and, additional information.

System circuit breakers apply similar types of consideration as the circuit breakers for specific securities as discussed above. An example could be the maximum amount of draw down for the system including all securities being traded. Another example of a circuit breaker may be an event such as the markets shutting down. Several circuit breakers will be offered.

Information about brokerage, account and access to data will tell the system the parameters it must work under for buying and selling securities and accessing data.

Figure 4:
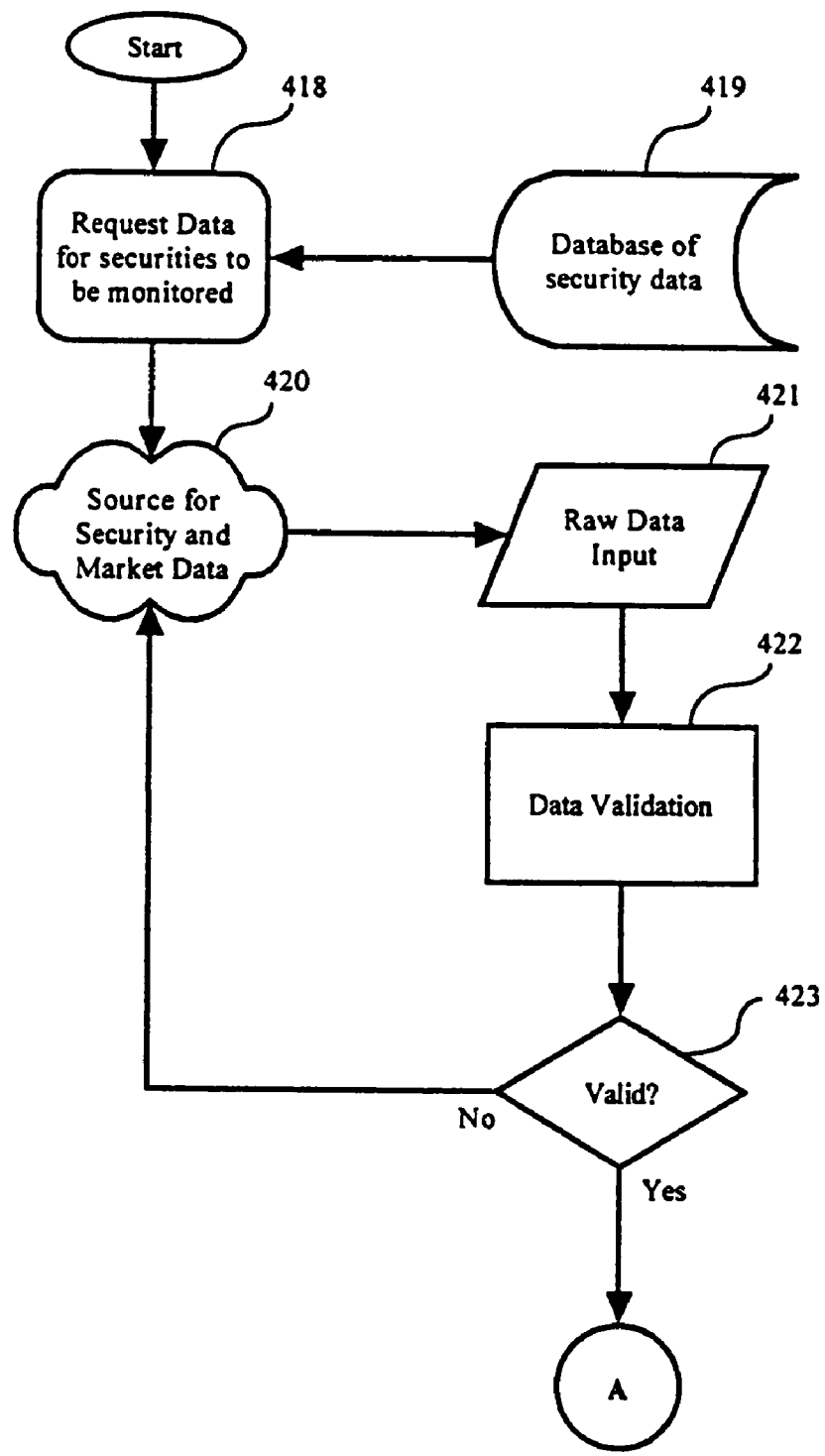
FIG. 4 is a flow chart for data input validation according to the present invention.

Referring now to FIG. 4, a flow chart of the system is illustrated continuing through FIG. 8. Step 418 requests the securities data and market data to be monitored. The securities to request data for are identified in the security database 419 (as input in step 54). The data is requested from a data source in step 420. This is the same source as data source computer 16 of FIG. 1. The security and market data from step 420 is raw data as illustrated in step 421. The raw data is compared to historical data in step 422 to verify that the data is in a valid range. If the data is outside of a valid range, then the same security data is requested again in step 420.

Figure 5:
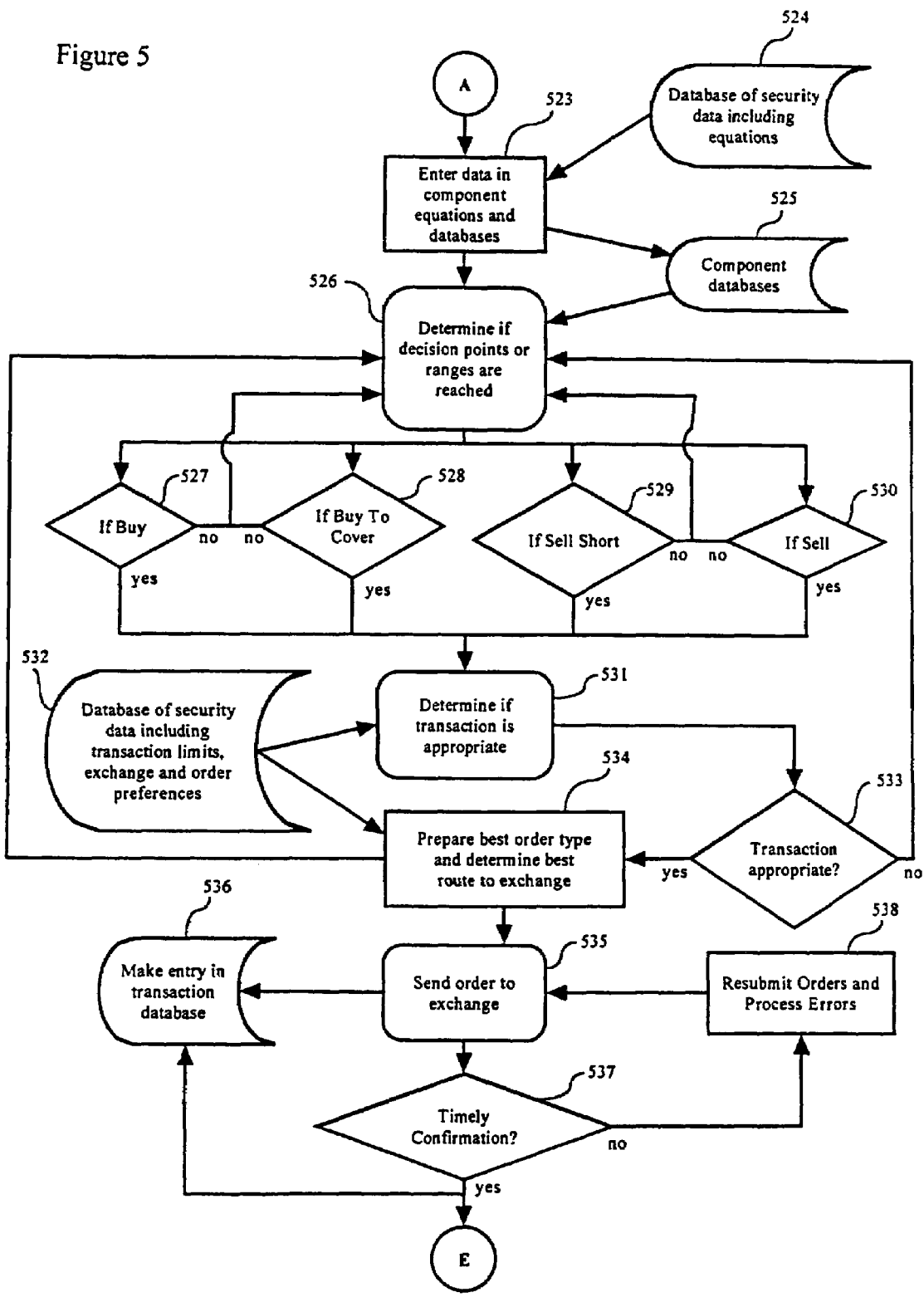
FIG. 5 is a data and analysis decision flow chart according to the present invention.

If the data is valid, the process continues in FIG. 5 at step 523, where data is entered in the component equations and databases. Step 523 will receive the identity of component equations and component databases for the corresponding securities to be traded from database 524. Data entered may also be saved in a component database in step 525. The flow of data into decision models and component databases is continuous.

Step 526 illustrates the process of calculating the results of the data in the components of the decision models and comparing the results to decision points as will be further discussed below.

As a result of step 526 a decision may be made to buy, sell, sell short or buy to cover a security. This is illustrated in steps 527, 528, 529, 530. The decision to buy, for example, is available for a specific security if the user selected that option and selected a buy decision model for the security. If a buy, sell, sell short or buy to cover order is not appropriate pursuant to a decision model then the system continues to monitor the decision models in process 526. The system will continue processing data through the input and decision models until the system is halted by the operator or by other system parameters.

If a decision is made to buy, sell, sell short or buy to cover then the system will proceed to step 531 where additional considerations are taken into account before a transaction is entered into. The embodiment of the process in step 531 is discussed in greater detail in FIG. 7 below. This step looks at whether to proceed based on several factors.

Step 531 checks to determine whether or not the transaction is appropriate. Information from a database 532 of security data including transaction limits, exchange and order preferences may be used in this process. Usually these parameters are input to the database prior to entering automatic transaction mode. In step 533, the appropriateness of the transaction is determined. If the transaction is not appropriate the process is returned to step 526. If the transaction is determined as appropriate, step 534 is executed.

Step 534 determines the best order type and which exchange to be used. For example, an order may be placed on more than one exchange. In step 535, the order is sent to the appropriate exchange or exchanges and an entry is made in the transaction database in step 536. In step 537, the system determines whether or not timely confirmation has been received. If no confirmation has been received, then step 538 may be executed wherein orders are resubmitted and checked for errors. After step 538, step 535 resubmits the order to the exchange or cancels the order if necessary. Referring back to step 534, during the ordering process, the system process flow may simultaneously return back to step 526 and send the order to the exchange in step 535. This allows the further processing of the decision models while the order is being processed. Back in step 526, if the decision points or ranges have not been reached then an order may be cancelled if it has not been executed.

Figure 6:
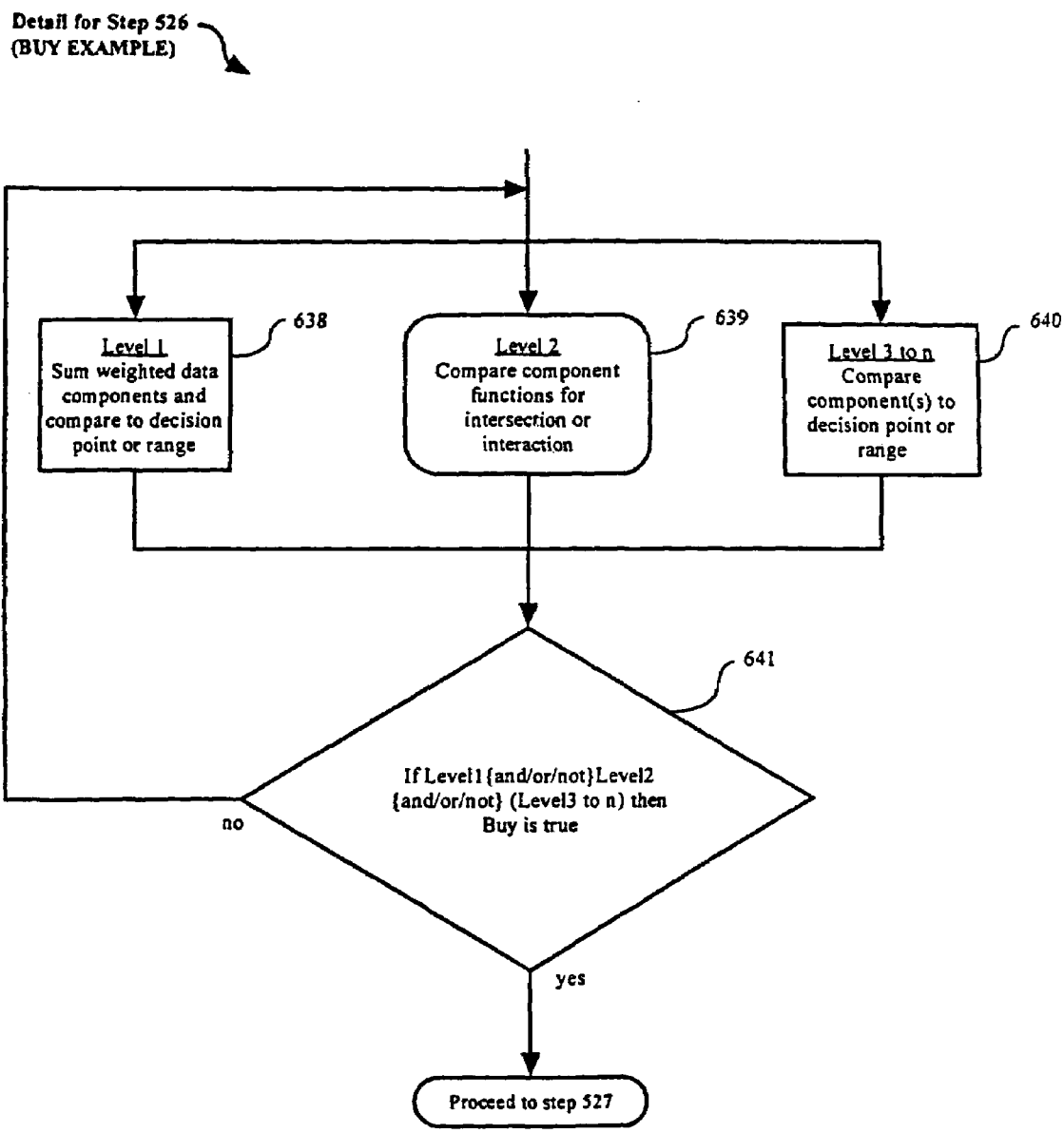
FIG. 6 is a decision point flow chart according to the present invention.

Referring now to FIG. 6, the logic of step 526 is illustrated in more detail. FIG. 6 provides one example of a decision model for a buy decision. A similar example applies to a decision model for a sell decision, sell short decision, or a buy to cover decision. FIG. 6 is one example of countless variations of a decision model. Step 638 illustrates Level 1 of the decision model. As discussed in reference to FIG. 3 there can be one or several levels in the decision model. Steps 639 and 640 illustrate the possible addition of Level 2 and Level 3. Step 638 illustrates a weighted data summation format for the components in Level 1. This is but one of the several options for defining the relationship between the components for Level 1.

As illustrated in step 638, for Level 1 to be TRUE requires that the sum of the weighted data be greater than or equal to its decision level. An example of process 638 is as follows:

If $\Sigma$ f(Comp_1) to f(Comp_n)$\geq$DPoint1 then Level 1 is TRUE

In this example f(Comp_1) represents a function of security data for Component 1. Additional functions of security data for components are represented by f(Comp_n). The decision point for Level 1 is represented by the variable DPoint1.

As illustrated in process 639, for Level 2 to be TRUE requires that there be intersection or interaction between the components. An example of process 639 is as follows:

If f(Comp_1)$\geq$f(Comp_2) then Level 2 is TRUE

In this example the functions of Component 1 and Component 2 are compared. One example may be when moving average of data is compared to another moving average.

As illustrated in process 640, for Level 3 to be TRUE requires that a component reach a specific value. An example of process 640 is as follows:

If f(Comp_1)=DPoint3 then Level 3 is TRUE

The above examples are illustrative of the different types of relationships available for each level of a decision model. There are unlimited variations as to the number of Levels in a decision model and the number and type of components at each level. The above example illustrates one of many options available.

Step 641 represents the final step of the decision model where the results of the separate levels are combined in an IF . . . THEN Boolean logic type operation. If the result of operation 641 is true then the system will proceed to step 527 where the system will proceed to prepare and submit a buy order for the security. For example, if there are three levels and the relationship in step 641 is represented as Level 1 <AND> Level 2 <NOT> Level 3 then for a buy decision to be made requires that both Level 1 and Level 2 have reached their decision point and Level 3 has not reached its decision point. If this occurs then the decision model will reach a buy decision.

Figure 7:
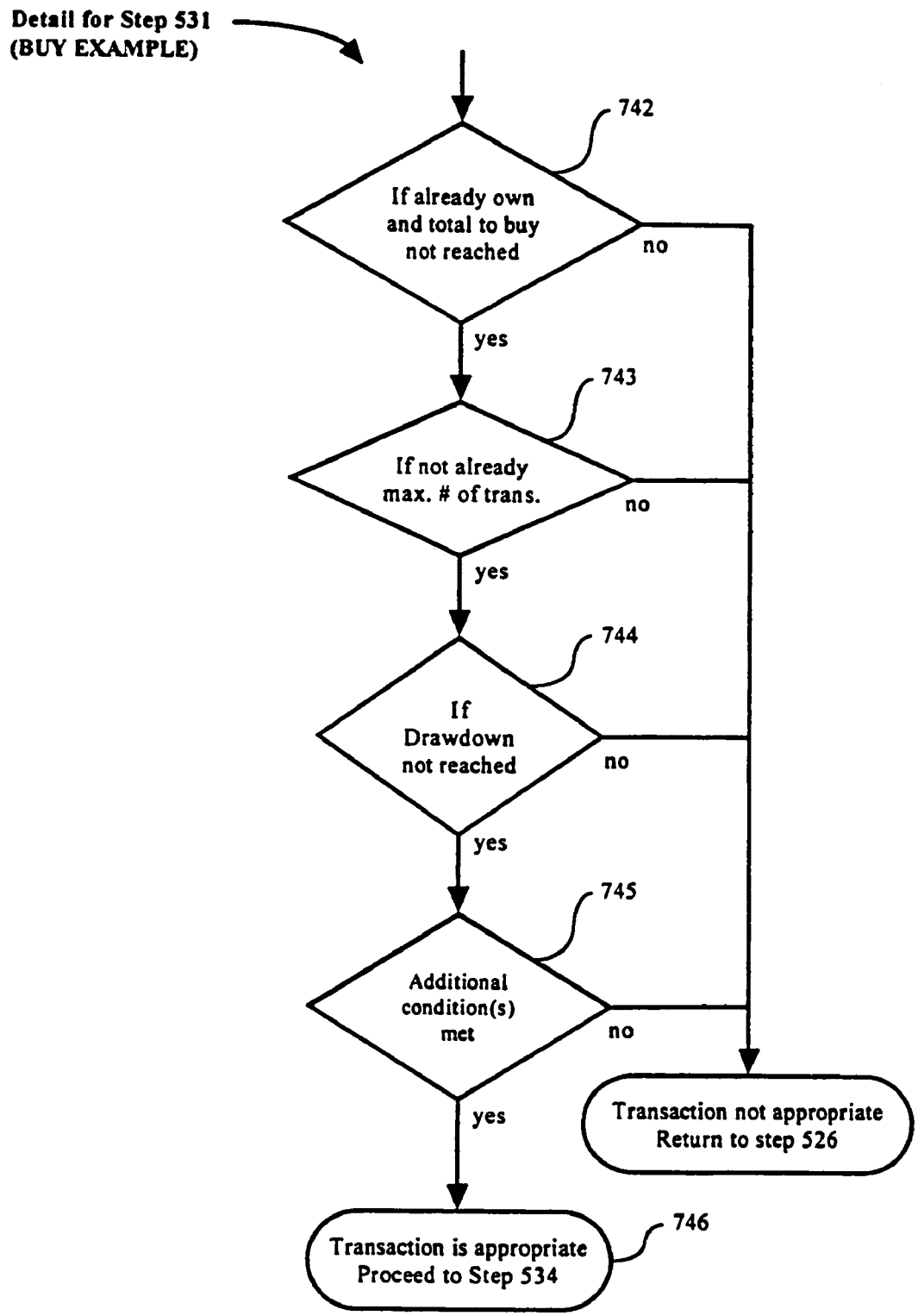
FIG. 7 is a transaction portion of a flow chart.

Referring now to FIG. 7, the logic that determines the appropriateness of a transaction for steps 531 and 533 is illustrated. FIG. 7 illustrates the logic in the event of a buy decision as a result of process 526. Similar logic would apply in the event of a sell decision, sell short decision, and buy to cover decision. In step 742, if the security is already owned and the total to buy is not yet reached, then step 743 is executed. If the maximum number of transactions has not been reached, then step 744 is executed. If an operator defined level of draw down has not been reached, step 745 is executed if appropriate. In optional step 745, additional conditions may be required to be met to determine whether or not the transaction is appropriate. If all of the above are true, then step 533 indicates an appropriate transaction is reached. If in steps 742 through 745 the logic is no, then a transaction will not be entered for the particular security.

Referring now to FIG. 8, the process for determining the best type of transaction from steps 535 is illustrated. In step 846, the best stock exchange is determined based on user preferences and the liquidity of the exchange for the security is determined. For example, one ECN may be desirable over another due to transaction costs or offering a better bid price. In step 847, the best method for order execution or as modified by user preferences may be determined. Step 847 looks to the price momentum, availability of shares and activities of market makers in determining the best method for order execution. In addition, step 847 will formulate an order that complies with established order rules for the exchange and order type to be used. Part of the information for steps 846 and 847 may be input from a database of security data that includes the preferences as pre-defined.

Referring now to FIG. 9, an example of the logic in step 847 above that may apply to determining the type of order based on order type and price momentum. A chart illustrates various market momentums and buy, sell or sell short orders. Various order types include: bid which is either high or low; an offer which can be either high or low; a small order execution system (SOES) order; and, a preference order to a specific market maker. An example of a determination of what type of order to be executed is illustrated. For example, for a buy order, depending on the market momentum, that is a momentum increasing, decreasing or staying the same, a bid may be processed high or low, respectively. A preference to a specific market maker may be bid high. If the momentum is decreasing, a bid between the spread may be formed and if the momentum is flat a bid between the spread may be formed. Also, if the momentum is increasing or staying the same, a SOES order may be placed.

If a sell order is required and the momentum is increasing, decreasing or staying the same, an offer high, an offer low, or an offer high may be formed respectively. Alternatively, an offer between the spread, an offer preference low, or an offer between the spread may be formed. Also, a SOES order may be implemented if the momentum is decreasing or staying flat.

If a sell short order is determined and the momentum is increasing, decreasing or staying the same, an offer high or an SOES order on an uptick may be performed. Alternatively, an offer between the spread and an offer low on an uptick may be generated. If the price momentum is falling or flat an offer at a predetermined level above the current price may be offered on a downtick. For example, an offer of 1/16 above the price may be executed.

Figure 10:
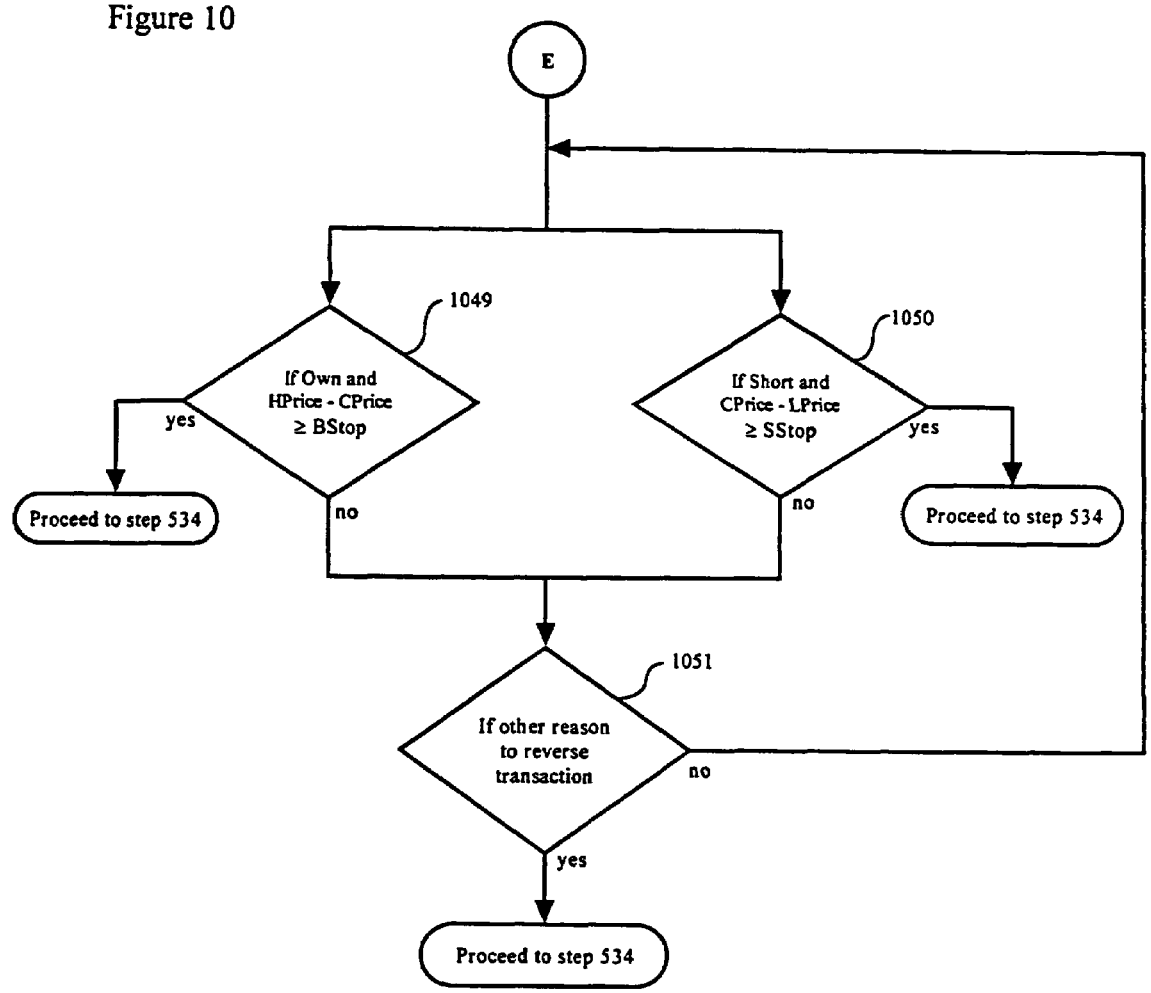
FIG. 10 is a floating stop loss flow chart according to the present invention.

Referring now to FIG. 10, a floating stop loss may also be used to determine when to sell or buy to cover a particular security. The floating stop loss illustrated in FIG. 10 is different from that of a traditional stop loss. A floating stop loss is a feature of the instant invention's constant monitoring of the market for the security. Rather than the traditional method where a stop loss order for a specific amount is sent to the broker, a floating stop loss is accomplished when the system determines to exit the transaction and immediately sends an order for execution. Another distinct advantage of the floating stop loss is that it can follow the advance of a security and exit at the moment the stock turns down. A trading method can be developed where a security is bought according to a buy decision model and sold based on the floating stop loss rather than a sell model.

Step 1049 illustrates the basic concept of the floating stop loss when the security is owned. HPrice is a variable for the highest price for the security from the time of its purchase. CPrice is a variable for the security current price. BStop is a variable for the stop loss amount that the current price can differ from the highest price before requiring a sell order. In a floating stop loss BStop can be fixed at an amount such as 1/16th point and 1/4th point. In a dynamic floating stop loss BStop may be set to increase or decrease based on the continued increase in the security price. For example, BStop can be set to increase 1/16th point for every point increase in price.

Step 1050 illustrates a floating stop loss for a security sold short. In this step LPrice is a variable for the lowest price for the security from the time that it was sold short. CPrice is a variable for the security current price. SStop is the variable for the stop loss amount. As in step 1049, SStop can be fixed at a specific amount for a floating stop loss or variable as the price decreases for a dynamic floating stop loss.

In step 1049 or step 1050 if the logic is no, step 1051 is executed. In step 1051, if there is no other reason to reverse the transaction then the logic loops back to step 1049 or step 1050 for further checking. Concurrent or parallel to this process the decision models continue to be monitored to determine if they dictate a reversal of the transaction. In step 1049 or step 1050 if the logic is yes, then step 534 is performed.

Figure 11:
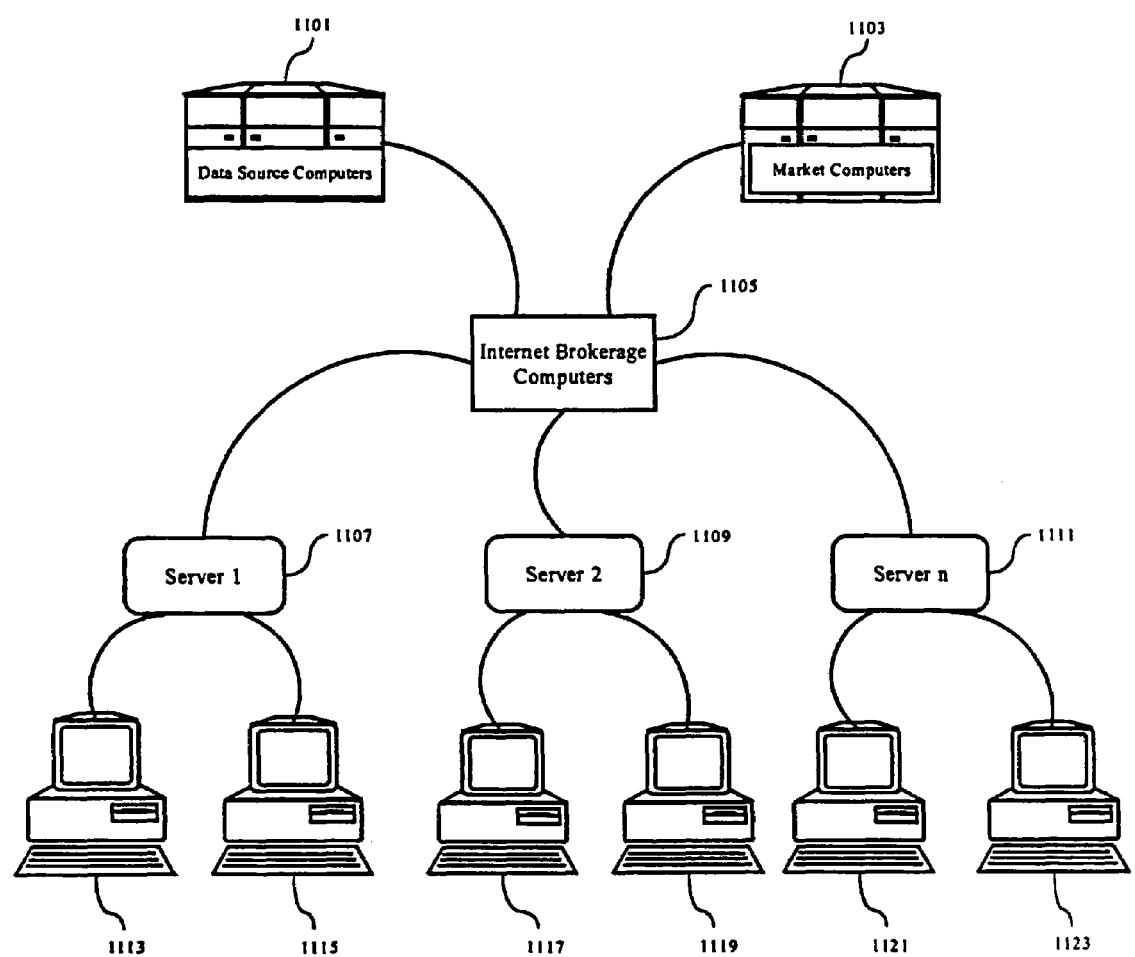
FIG. 11 is a block diagrammatic view of an alternative embodiment of a trading system suitable for an on-line brokerage system.

Referring now to FIG. 11, an embodiment of the invention is illustrated. The present embodiment is suitable as an option for traders using a common source such as an Internet brokerage 1105. Internet brokerage 1105 has as resident on its computers' programs to implement the methods of the instant invention. Internet brokerage 1105 receives its market data from data source computers 1101 and connects to market computers 1103. Computers 1101 and 1103 may be implemented on the same computer system and may be integral. For example, computers 1101 and 1103 may be the common computer system of NASDAQ computers. Internet brokerage 1105 may include one or more mainframe computers or minicomputers with assorted microcomputers connected.

Servers 1107, 1109, 1111 represent a plurality of servers on the Internet connecting the Internet brokerage 1105 to the client computers 1113, 1115, 1117, 1119, 1121, and 1123. Client computers 1113, 1115, 1117, 1119, 1121, and 1123 may be of the type as described above. The client computers may also be "dumb" terminals such as a WebTV® device. Through their client computers the system users will be able to establish the parameters of the trading as discussed above. However, in this embodiment most, if not all, of the processing of the decision models may take place at the Internet brokerage computers 1105. Information about transactions will be displayed at the client computers. One advantage to such a system is that because trades are automatically executed, one less link, i.e., to the end user and back, during execution is performed. Therefore, any time associated with that connection is eliminated when executing a trade. Because market momentum may be rapid, timely execution of trades may reduce cost and increase the overall profits of the transaction.

In operation, a predetermined number of securities are identified to the system. A decision model for each of the securities is determined. Real-time market data is monitored as well as information from the databases. In response to the market data for the security and the decision model, a transaction order is automatically generated. The system automatically transmits the transaction order to the market computer. During the process and before execution of the order, the order is continually monitored to determine if it is appropriate. If the transaction at any time before execution is determined to be inappropriate, the order may be canceled. In addition, the system may be run in a training mode allowing the decision models to be tested prior to actual implementation and actual trading.

While particular embodiments of the invention have been shown and described, numerous variations and alternate embodiments will occur to those skilled in the art. Accordingly, it is intended that the invention be limited only in terms of the appended claims.

What is claimed is:

1. A process for automated trading of a security through a brokerage computer system in communication with a client computer system, comprising:

providing a brokerage having a brokerage computer system for transacting orders to buy and sell securities, wherein the brokerage computer system is in communication with a plurality of client computer systems;

receiving at the brokerage computer system from the client computer system at least one computer implemented buy decision model for the security wherein an at least one buy decision model provides for making a decision to buy based on more than price data for the security;

selecting at least one computer implemented sell decision model for the security;

providing a computer implemented monitoring process on the brokerage computer system for monitoring the decision models for a buy decision or a sell decision wherein the monitoring process comprises resolving a mathematical equation of the at least one buy decision model and comparing the result to a decision point;

providing a computer implemented transaction approval process on the brokerage computer system for determining after the decision to buy or sell the security is made if a transaction to buy or sell the security is appropriate;

providing a computer implemented transaction submission process on the brokerage computer system for submitting a transaction to buy or sell the security to a market computer system and monitoring the transaction until it is completed;

inputting data into the at least one buy decision model and an at least one sell decision model wherein the data comprises data for the security wherein the data is input into the decision models at the brokerage computer system;

monitoring the decision models through the monitoring process for at least one of the buy decision or the sell decision;

when the buy decision is reached then determining through the transaction approval process whether a buy transaction is appropriate and if so then automatically submitting to the market computer system through the transaction submission process an order to buy the security, otherwise continue monitoring the decision models;

when the sell decision is reached then determining through the transaction approval process whether a sell transaction is appropriate and if so then automatically submitting to the market computer system through the transaction submission process an order to sell the security, otherwise continue monitoring the decision models; and continuing inputting data into the decision models, monitoring the decision models through the monitoring process, and repeating the steps for when the buy decision is reached or when the sell decision is reached, wherein the process for automated trading allows for repeated buying and selling the security without stopping between transactions.

2. A process for automated trading a security through a brokerage computer system in communication with a client computer system comprising the steps of:
a. receiving at the brokerage computer system from the client computer system one or more computer implemented decision models for a security wherein the one or more decision models comprise at least one of a buy logic for deciding to buy the security and a sell logic for deciding to sell the security, wherein the buy logic and the sell logic comprises one or more mathematical equations of data for the security;
b. providing on the brokerage computer system a computer implemented monitoring process for monitoring the one or more decision models for a decision to buy the security or a decision to sell the security wherein the monitoring process comprises resolving the one or more mathematical equations;
c. providing on the brokerage computer system a computer implemented transaction approval process for determining if a transaction to buy or sell the security is appropriate once the decision to buy or the decision to sell has been made;
d. providing on the brokerage computer system a computer implemented transaction submission process for submitting the transaction to buy or sell the security to a market computer system and monitoring the transaction until it is completed;
e. inputting data into the one or more decision models, wherein the data is input into the one or more decision models until the process is stopped, wherein the data comprises the data for the security;
f. monitoring the one or more decision models using the monitoring process, for the decision to buy or the decision to sell;
g. when the decision to buy or the decision to sell is reached then determining using the transaction approval process whether a buy or sell transaction is appropriate and when so automatically submitting using the transaction submission process an order to buy or sell the security; and
h. iteratively repeating above steps f. and g. until the process for automated trading is stopped.

3. The process of claim 2 wherein the decision model comprises a weighted data process.

4. The process of claim 2, further comprising:
after the steps of submitting an order to buy the security and monitoring the transaction until it is completed, automatically initiating a floating stop loss process for selling the security wherein either the floating stop loss process or the decision model can reach a decision to sell the security.

5. The floating stop loss of claim 4 wherein the floating stop loss is a dynamic floating stop loss.

6. The process of claim 2 further comprising the step of validating the data before the step of inputting the data into the decision model.

7. The process of claim 2 wherein the one or more decision models further comprises a sell short logic for deciding to sell short the security and a buy to cover logic for deciding to buy to cover the security.

* * * * *

UNITED STATES PATENT AND TRADEMARK OFFICE
CERTIFICATE OF CORRECTION

PATENT NO. : 7,356,499 B1
APPLICATION NO. : 09/500624
DATED : April 8, 2008
INVENTOR(S) : Dean Amburn It is certified that error appears in the above-identified patent and that said Letters Patent is hereby corrected as shown below:

On the title page, under Other Publications, please add the following cited reference:

"Computerized Trading: Maximizing Day Trading and Overnight Profits", by Mark Jurik (editor), dated 1998.

Signed and Sealed this

Twenty-fourth Day of November, 2009

David J. Kappos
*Director of the United States Patent and Trademark Office*